C. H. AYARS.
CAN CAPPING MACHINE.
APPLICATION FILED FEB. 8, 1906.

908,373.

Patented Dec. 29, 1908.

Witnesses
Edwin L. Bradford
G. Ferdinand Voyt

Inventor
Charles H. Ayars

By
Mann & Co,
Attorneys

UNITED STATES PATENT OFFICE.

CHARLES H. AYARS, OF SALEM, NEW JERSEY, ASSIGNOR TO AYARS MACHINE COMPANY, OF SALEM, NEW JERSEY, A CORPORATION OF NEW JERSEY.

CAN-CAPPING MACHINE.

No. 908,373.    Specification of Letters Patent.    Patented Dec. 29, 1908.

Application filed February 8, 1906. Serial No. 300,156.

*To all whom it may concern:*

Be it known that I, CHARLES H. AYARS, a citizen of the United States, residing at Salem, in the county of Salem and State of New Jersey, have invented certain new and useful Improvements in Can-Capping Machines, of which the following is a specification.

This invention relates to machinery for capping cans and making the final closure to hermetically seal the contents of the can.

The invention has among its objects to provide a machine that will facilitate the operations attending the final closing of the cans after they have been filled, and to provide a construction of machine that may be readily adjusted so that cans of various sizes may be capped.

Another object of the invention is to provide devices that will hold the newly-soldered caps down on the cans after they leave the capping steel or iron for a sufficient period to enable the solder to set.

Another object of the invention is to provide an improved construction of single flexible carrier with a plurality of individual can-seats on which the cans are placed at the initial operation and where they remain while all of the succeeding operations are being effected.

With these and other objects in view the invention is illustrated in the accompanying drawings, in which, Figs. 14, and, 15, are detail views of one of the removable can-spacing devices. Fig. 16, is a vertical section through the cap-holder device to hold the caps down while they cool,—the section being taken on the line 16—16 of Fig. 1. Fig. 17, is a detail of one of the cap holding rollers.

Referring to the drawings, the numerals, 1, designate two vertical sides frames which are connected at their upper ends by a suitable beam, 2, and at their lower ends by a similar beam, 3. A hollow or tubular shaft, 4, extends vertically from the lower beam, 3, through the upper beam, 2, and just below the upper beam this shaft is provided with a screw-threaded portion, 5. Below the threaded portion the tubular shaft is further provided with one or more ports, 6, through which the air and gas which in the present instance enters the upper end of the shaft may pass out as will presently appear. The lower end of the shaft is closed so that the air and gas cannot escape at that end. A screw-threaded collar, 7, surrounds and engages the threaded portion of the tubular shaft and said collar is provided with downwardly-extending or pendent arms 8.

A circular head, 9, has a central hub, 10, which fits the shaft snugly but is free enough to slide vertically thereon and this head has a flanged sleeve portion, 11, at its upper side with which the pendent arms, 8, on the collar, 7, engage so as to hold the circular head on the shaft at a given distance below the collar. It will be seen that by rotating the collar on the shaft by means of the laterally-projecting rods, 12, it may be made to travel on the shaft in a vertical direction and thereby be raised or lowered as desired. As the circular head is sustained entirely by the collar its position on the shaft may be changed by rotating the collar in the proper direction.

Below the head, 9, and also surrounding the tubular shaft is a circular drum, 13, having reduced ends, 14, which are screw-threaded so as to receive a packing gland, 15. This drum forms a chamber, 16, around the shaft into which the ports, 6, in the shaft open so that the air and gas forming the heating agent may accumulate in the chamber of the drum. Bolts, 17, depend from the circular head, 9, and have their lower ends secured in the walls of the drum and serve to sustain the drum pendently from the head.

A plurality of pipes, 18, radiate from the drum and each of these pipes has a valve, 19, which controls the passage of the heating agent through it. The outer ends of the pipes form burners, 20. The drum and radiating pipes are vertically adjustable on the shaft simultaneously with the head, 9, and collar, 7, and the packing gland, 15, prevents the escape of the heating mixture, (air and gas).

Around the periphery of the circular head, 9, are a plurality of brackets, 21, each of which carries a vertical tube, 22. At the upper end and just above the bracket each tube is provided with a circular collar, 23, which is rigid thereon and which has a roller, 24, at its inner side. The lower pendent end of the tube, 22, carries a circular soldering steel or iron, 25, and also carries a fire-box or heat chamber, 26. This fire-box surrounds the soldering-iron and has a fixed relation with respect thereto and at one side the fire-box is provided with a flared mouth, 27, with an elongated entrance, 28, into which the burner, 20, projects.

It will be understood that the tube soldering iron and fire-box are all capable of vertical movement independently of the bracket, 21, and the head, 9, but that they are adjustable with said head.

As the weight of the soldering steel and all those parts connected to the tube, 22, would rest on the can during the soldering operation, it has been found in practice that the weight is too great, and will interfere with the proper revolution of the can, and in order to avoid this I provide a spring, 29, which is carried by the head, 9, and which engages a projecting pin, 30, on the tube, 22, which will aid in sustaining the weight of said iron. The pin, 30, projects through a slot, 31, in the bracket, 21, and thus prevents rotation of the tube and iron when the latter is in contact with the can cap.

A rod, 32, extends vertically through the tube, 22, and carries a weight, 33, at its upper end. This rod performs the usual function in holding the cap down on the can during the soldering operation.

Figure 1:
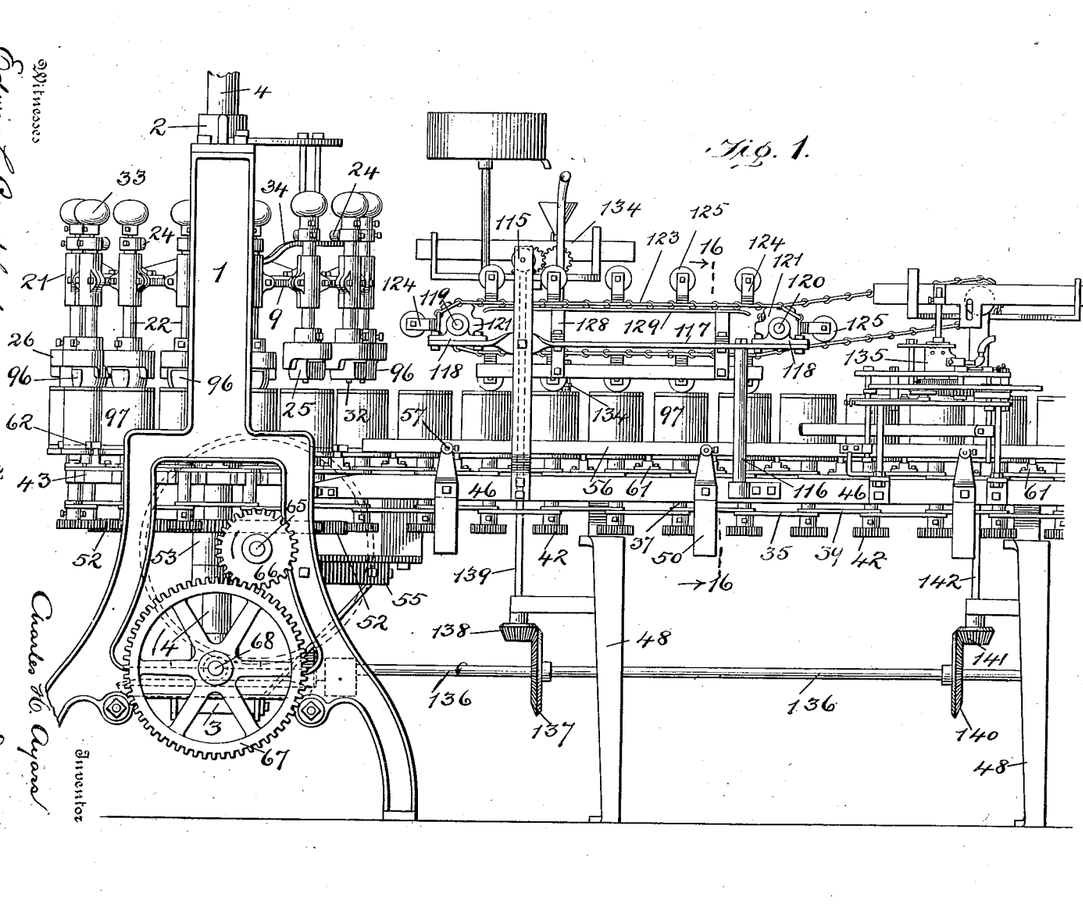
Figure 1 illustrates a side elevation of the machine, the driving pulley being removed.
Figure 4:
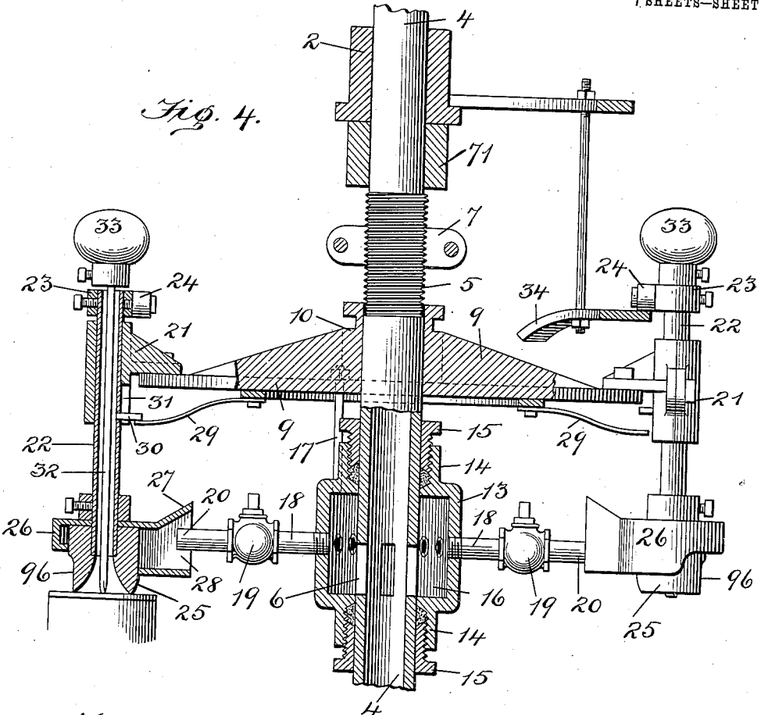
Fig. 4, is an enlarged sectional elevation of the upper part of the hollow shaft to show the air and gas chamber, burners and soldering irons.
Figure 5:
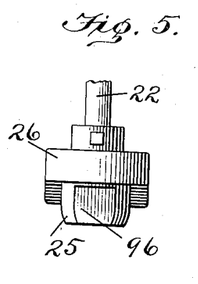
Fig. 5, is a detail view showing the lower end of the soldering iron and its surrounding firebox or heat chamber.
Figure 6:
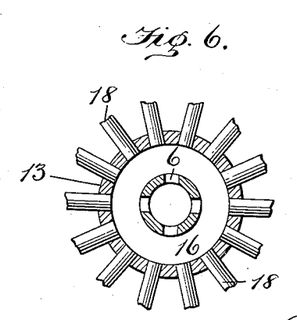
Fig. 6, is a horizontal sectional view through the air and gas chamber and hollow shaft and shows the ports in the hollow shaft.
Figure 7:
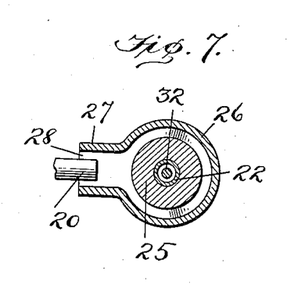
Fig. 7, is a horizontal sectional detail through one of the soldering irons and the surrounding fire-box or heat chamber.

It is to be understood that all the parts and devices sustained by the head, 9, turn with the shaft but that the irons, 25, do not rotate and only have a sufficient vertical movement to enable the cans to be moved beneath and from the irons. This vertical movement of the irons is accomplished by the rollers, 24, riding up on a cam track, 34, which is stationarily supported below the upper cross-beam, 2, as will be seen in Figs. 1 and 4 of the drawings.

Figure 13:
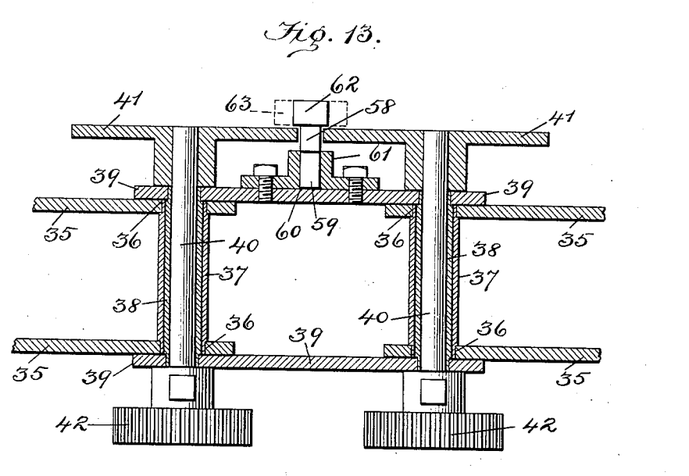
Fig. 13, is an enlarged sectional detail through the can-seats and flexible carrier.

In the operation of the present invention the cans are placed on seats which are sustained by a flexible carrier and caused to revolve as they advance and the construction of this carrier will now be described, special attention being directed to Figs. 8 and 13 of the drawings. The carrier comprises a plurality of links, 35, which are arranged in pairs,—one above the other, and which are provided at their ends with a perforation, 36. A sleeve, 37, has reduced ends which enter the perforations in the links and serve to hold the links in proper position with respect to each other. A bushing, 38, extends through the sleeve, 37, and the ends of said bushing project beyond the outer surfaces of said links, 35, so as to enter a perforation in the end of a connecting or bridge-link, 39. The ends of the bridge-link, 39, are therefore pivotally retained with respect to the ends of the links, 35, so as to make a flexible joint between the links at their overlapping ends. A vertical stem or shaft, 40, extends through the bushings, 38, and the upper end of each stem carries a disk, 41, which forms a seat for the filled cans to rest upon while the lower end of the shaft carries a pinion, 42, which is to be revolved in a horizontal plane, as will presently be described.

From the foregoing description it is to be understood that the carrier has the form of a sprocket chain which travels in a horizontal plane and each joint of the chain forms a bearing for a can-seat shaft.

The devices and mechanism for sustaining the sprocket chain and driving it in a horizontal plane will now be described.

Figures 8, 9, 10, 11, 12:
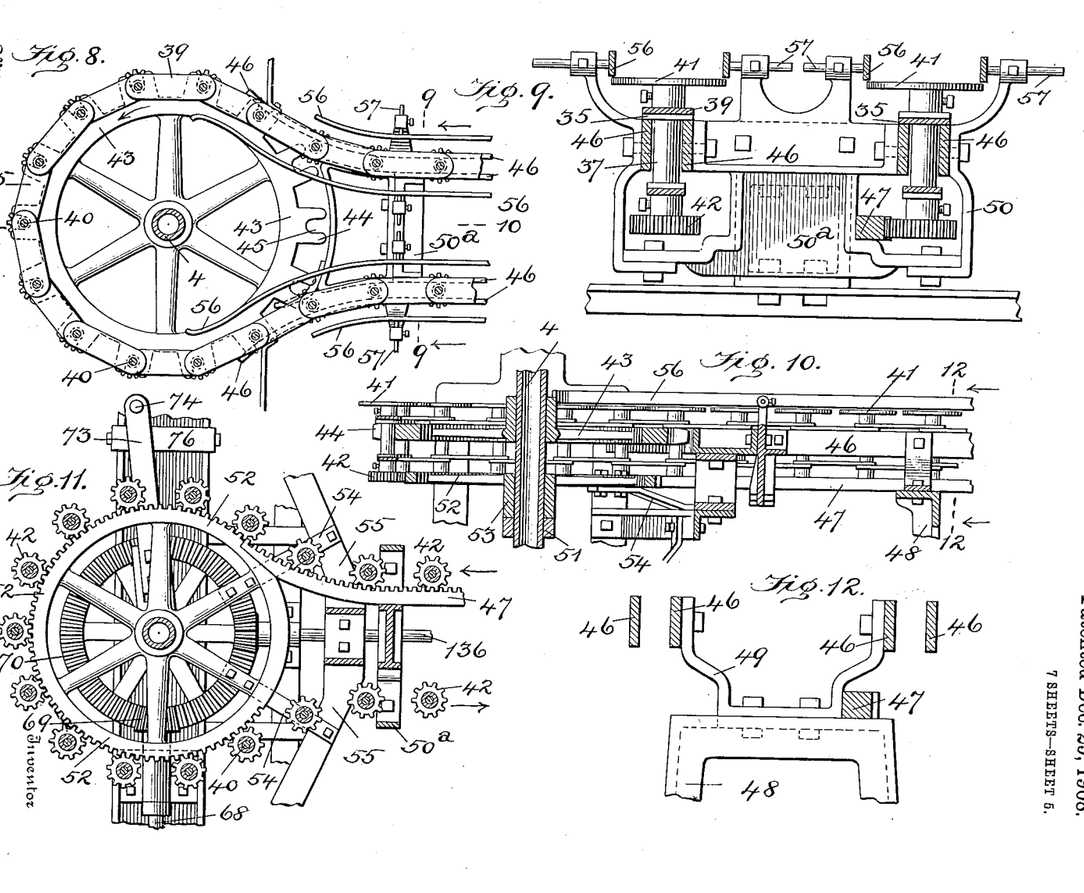
Fig. 8, is a plan view of a portion of the flexible carrier without can seats and the driving wheel therefor.
Fig. 9, is an enlarged vertical section taken on the line 9—9 of Fig. 8.
Fig. 10, is a central longitudinal section through the hollow shaft and the carrier and can seat operating devices, the section being taken on line 10—10 of Fig. 8.
Fig. 11, is a plan view of the devices for rotating the can seats.
Fig. 12, is an enlarged detail view showing a vertical section through the vertical guides for the shafts of the can seats,—the section being taken on the line 12—12 of Fig. 10.

A sprocket-wheel, 43, is mounted on the tubular shaft, 4, so as to revolve therewith in a horizontal plane and by reference to Fig. 8, it will be seen that the teeth, 44, on this wheel are provided with concave recesses, 45, which receive the sleeves, 37, at the joints of the chain links and draw the chain in the direction in which the sprocket-wheel moves. A similar sprocket wheel is supported at the opposite end of the machine around which the sprocket-chain and can-seats pass on their return. This latter wheel, however, has been omitted in the drawing merely because of the lack of room on a single sheet to illustrate it.

Between the two ends of the machine the sprocket chain is supported and guided by parallel rails, 46, which are spaced apart sufficiently to enable the sleeves, 37, of the carrier chain to pass in a vertical position between them, while the upper links, 35, of the chain rest and slide upon the top surface of the parallel rails, as will be seen in Fig. 9. While the chain is thus sustained by the guide-rails the pinions, 42, will hang pendently below the rails, and while traveling along one side of the machine these pinions mesh with a stationary rack, 47, extending only on one side of the machine where it is supported at several points by the vertical legs, 48, and at other points by suitable brackets, 50ª. The rack, 47, causes the pinions, 42, and can-seats, 41, to rotate while passing along one side of the machine.

Beneath the sprocket-wheel, 43, the tubular shaft, 4, is provided with a collar, 51, and a circular rack, 52, has a central hub, 53, which loosely fits the shaft and rests on the collar, 51. Brackets, 54, project from the frame, 55, and extend beneath the circular rack to which they are bolted, as clearly seen in Fig. 11.

From the foregoing description it is to be understood that the can seats are revolved as the chain passes over the rails along one side of the machine and continue to revolve as the chain travels around with the sprocket wheel, but as the chain leaves the sprocket wheel it merely passes onto the guide-rails at the opposite side of the machine and the pinions, 42, are free and the seats then discontinue their revolution.

At the side of and just above the seats are stationary can-guide rails, 56, which are supported by stems, 57, which are adjustably mounted in suitable brackets, placed at intervals along the machine.

Between each two adjoining can-seats are separating blocks 58, (see Figs. 13, 14 and 15) which project above the seats and prevent the cans from becoming displaced and overlapping two seats, and also serve to center the cans on the seats. These blocks are sustained by the upper bridge-link, 39, of the sprocket chain and are held in a vertical position by their lower ends, 59, entering a socket, 60, in a plate, 61, which is secured on the top surface of said link. The upper end, 62, of these blocks projects laterally over the periphery of the can-seats, 41, and in case a smaller sized can is to be capped these blocks may be lifted out of the sockets as they are not secured therein and another block substituted having a larger head as indicated by broken lines, 63, in Fig. 13.

Motion is imparted to the machine through a pulley, 64, on the outer end of a main driving shaft, 65, which extends horizontally between and has bearing in the frames, 1. A pinion, 66, is secured on the main shaft and said pinion meshes with and drives a gear, 67, on a shaft, 68 which is beneath it. This latter shaft, at its inner end, carries a bevel pinion, 69, which meshes with and drives a horizontal gear, 70, at the bottom of the tubular shaft, 4.

Referring now to Figs. 2, 3 and 18 to 22 inclusive, the mechanism and devices for effecting the feeding of wire solder to the capping irons when a can is present, and the cutting off of said feed during the absence of a can, will now be described. In the operation of this solder feed the solder distributer which presents the solder to the iron is caused to move forward to meet the iron and to return with said iron during the application of the solder to the latter. This back-and-forth movement of the iron is utilized to feed the solder provided a can is on the seat below the iron, but if for any reason an empty seat is presented the solder distributer will make its back-and-forth movement without, however, operating to feed solder.

Figures 3, 22:
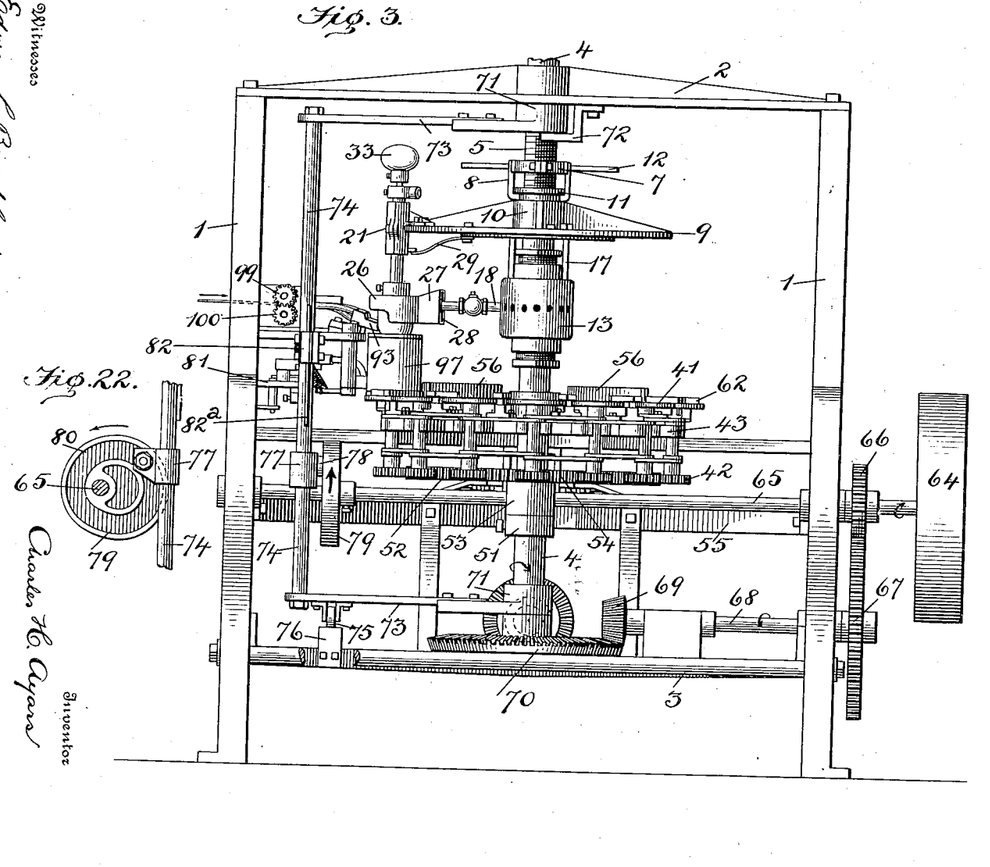
Fig. 3, an end elevation of the same, with the exception that all but one of the soldering irons and burners have been omitted.
Fig. 22, is a detail side elevation of the cam and swinging bar for operating the solder feed.

By reference to Fig. 3, it will be seen that at the upper and lower ends of the tubular shaft, 4, are two crank-like arms, 71,—the upper arm being sustained in its elongated position from beneath by a bracket, 72. These arms are loosely mounted on the shaft and are not revolved therewith. Bars, 73, project laterally from the arms, 71, and their outer ends are connected by a vertical rod, 74. A caster or roller, 75, is secured on the bottom of the lower bar, 73, and rolls on a horizontal track-plate, 76, which is secured to the lower cross-beam, 3. This caster serves to support the weight of the arms and rod. A clamp, 77, is secured around the vertical rod, 74, and carries a roller, 78, at one side which is free to turn. The vertical position of the clamp and roller is such as to bring it into proximity to the main horizontal driving shaft, 65. A cam, 79, is carried on this main shaft at the side of the rod, 74, and said cam has a groove, 80, in its side next to the rod, so the roller on the clamp may project into said cam-groove, 80, and impart a back-and-forth movement to said rod. Above the cam, 79, is a horizontal plate, 81, which is rigidly secured on the vertical rod, 74, by a clamp, 82, and feather, 82ª, and this plate projects laterally in front of the said rod and moves back-and-forth therewith. At one edge and adjacent the rod, 74, a downwardly-projecting stem, 83, is provided on the bottom of this plate. The lower end of this stem pivotally supports a horizontal bar, 84, which has a vertical flange, 85, at one edge and this flanged edge of the bar projects horizontally and at the side and in the path of the traveling cans as they begin to make the circuit around the sprocket wheel, 43. A lug or pin, 86, projects from the bar, 84, and a spring, 87, serves to keep the free end, 88, of the bar pressed in the direction of the cans, as will be seen in Figs. 19 and 20. The particular function of the bar, 84, is to stop the feed of solder— that is, if for any reason a can-seat, 41, should arrive at the bar, 84, without a can the bar will make a movement that will stop the solder-feed. The presence of a can, however, holds the bar, 84, and prevents such movement. On top of the plate, 81, is a housing, 89, comprising parallel spaced-apart side-walls, 90, in which the grooved solder feed rolls, 91, are mounted. Solder carrying tubes, 92, are sustained in front of the housing and the inner ends of these tubes register with the grooves in the rolls while the outer ends of said tubes enter a head or distributer, 93, which is sustained on an inclined block, 94, at the edge of the plate, 81, and adjacent the path of the soldering irons, 25. It will be noted that the solder distributer is broad and flat at its discharge-end, 95, and that when the plate, 81, is moved forward to meet the iron this flat discharge-end takes position adjacent a flattened surface, 96, of the soldering iron so that the solder when fed to the iron will be applied to said surface of the iron close to the top of the can, 97. A bevel gear, 98, is provided on one end of the shaft of the upper solder feed roll by which the latter is revolved and the opposite end of said shaft carries a gear, 99, which meshes with a similar gear, 100, on the shaft of the lower roll as shown in Fig. 3. The bottom plate, 101, of the housing is provided at one edge with a vertical bearing, 102, through which a vertical shaft, 103, extends. The upper end of this shaft carries a pinion, 104, which meshes with and imparts a partial rotary motion to the gear, 98, on the solder roll shaft. The mechanism employed to cause this shaft, 103, to make partial revolutions will be described. Projecting from the frame, 1, is a bracket, 105, from which a stationary stem, 106, projects upwardly in a vertical direction. A lever, 107, is pivotally sustained on the lower end of the vertical shaft, 103, and this lever has a slotted or bifurcated end, 108, which moves loosely around the stationary stem, 106. The pivoted end of this lever carries a pawl, 109, which latter in turn carries a curved plate, 110, which curves outwardly and in advance of the engaging end of the pawl. A ratchet wheel, 111, is fixed on the vertical shaft, 103, and has position on top of the lever, 107, and at the side of the pawl, 109, and the latter is designed to engage the ratchet when the lever is oscillated in a horizontal direction and impart a partial revolution to said ratchet and shaft and also to impart a like movement to the pinion, 104, and solder rolls. A trip-lever, 112, has one end pivoted to the can-engaging bar, 84, and its other end is provided with a slot, 113, through which the vertical solder-feed shaft, 103, passes. This slotted end of the trip-lever rests on top of the ratchet-wheel, 111, and slides thereon. The under side of this trip-lever is provided with a shoulder, 114, with which the curved plate, 110, on the pawl, 109, contacts.

Figure 20:
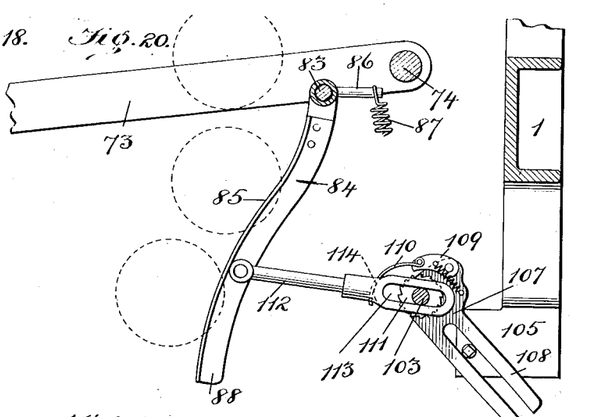
Figure 21:
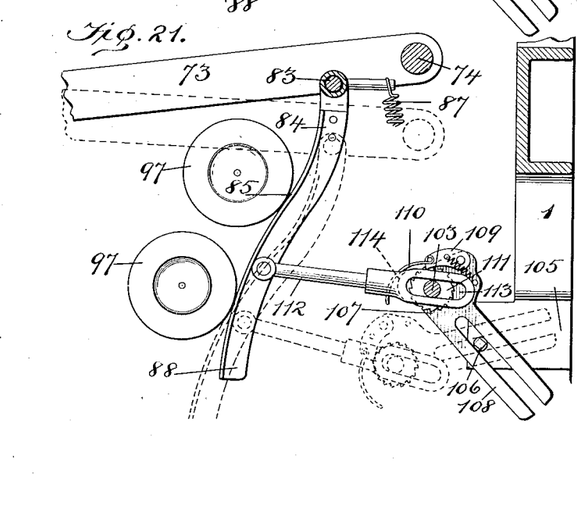

If a can is absent from a seat as the latter arrives at the can-lever, 84, said lever will swing outwardly over the seat and take the position shown in Fig. 20. In taking this position the can-lever will draw the trip-lever, 112, outwardly by sliding the slotted end over the flat side of the ratchet wheel and in making this movement the shoulder, 114, on the bottom of the trip will operate the curved plate, 110, of the pawl and disengage it from the ratchet so that when the entire solder mechanism is moved forward to meet a can the pawl will be held out of engagement and permit the ratchet wheel to remain idle. If a can is present on the seat the circular wall of the can will push the can-lever and trip toward the ratchet and permit the pawl to engage the ratchet and feed the solder. It will thus be understood that in the operation the solder feed devices move forward to meet a soldering iron and return in register with said iron, and the solder will be fed only when a can is present.

In order to insure that the soldering of the caps on the cans will be perfect I have provided an improved device to hold the caps down on the cans after they leave the heated soldering irons in order to enable the solder to set and cool. This mechanism will now be described, reference being had to Figs. 1, 2 and 16 of the drawings.

Figure 2:
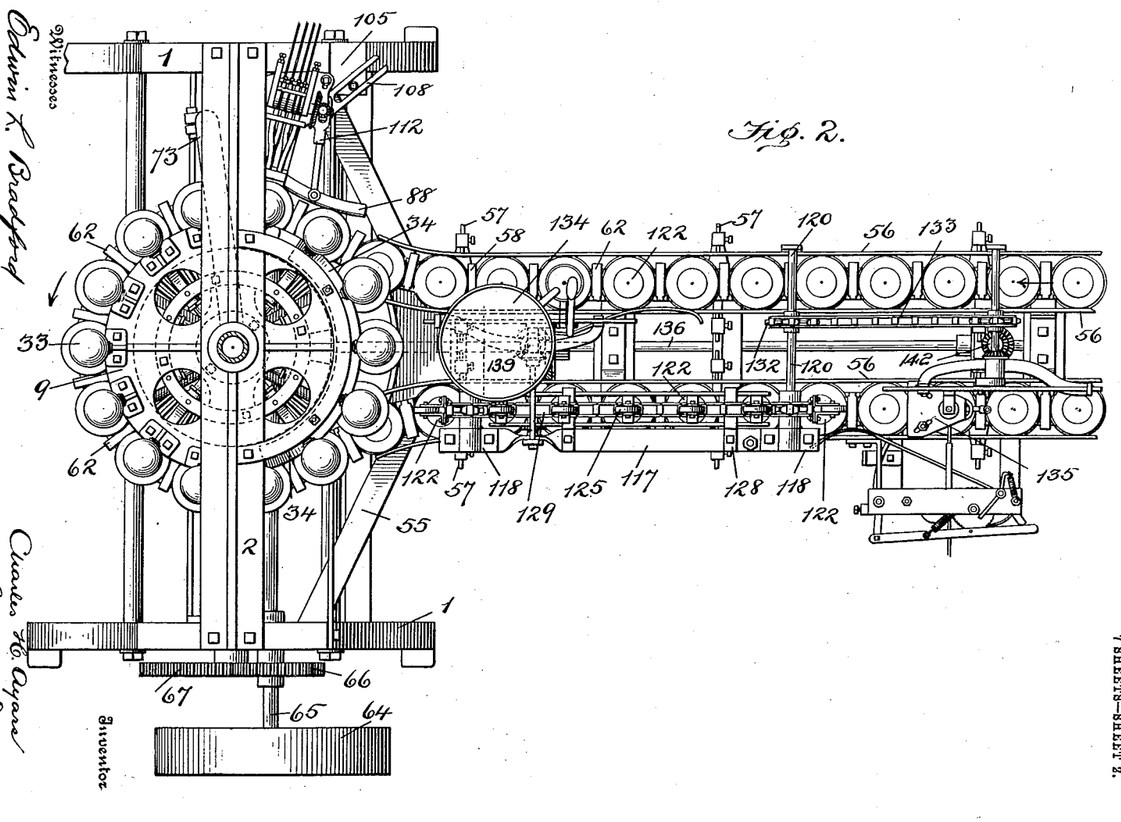
Fig. 2, a plan view of the same.
Figures 14, 15, 16, 17:
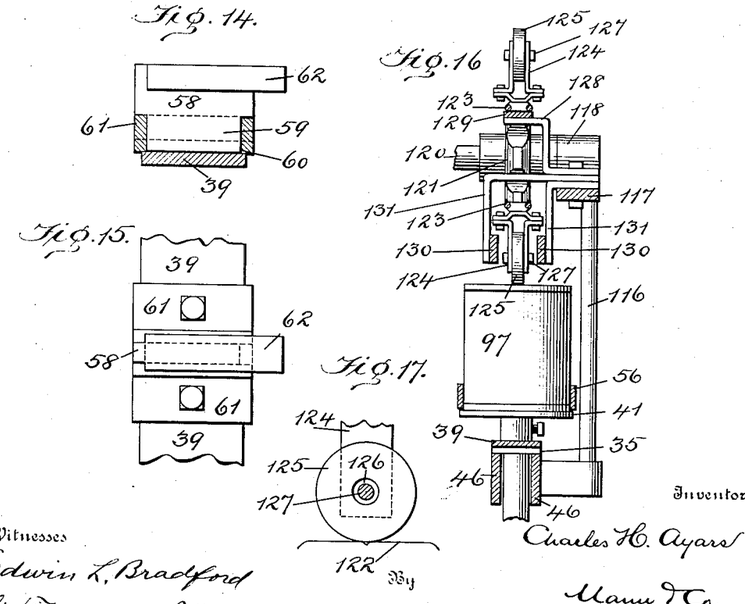
Figure 18:
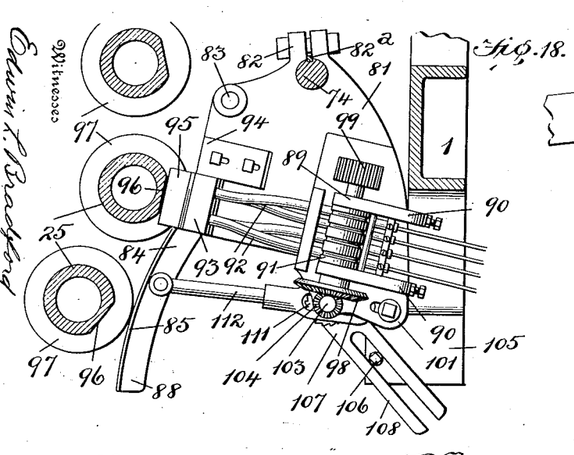
Figs. 18, 19, 20 and 21, are detail views of the solder-feed devices,—the Figs. 20 and 21 being sections taken on the line *a—a* of Fig. 19.
Figure 19:
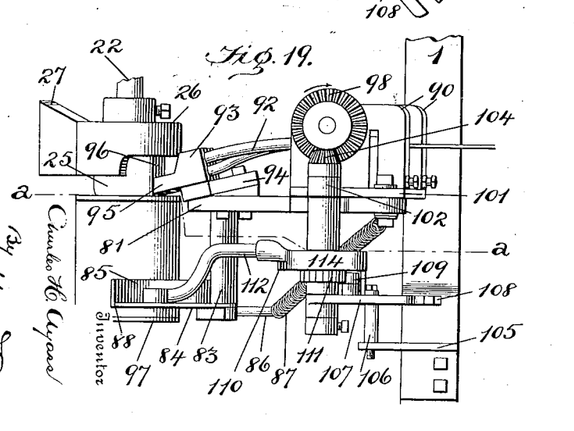

Secured to the guide-rails, 46, at the discharge side of the machine, and projecting vertically therefrom are two standards or supports, 115, and, 116, which sustain a horizontal bar, 117, in a plane above the cans. This horizontal bar is provided at each end with a bearing, 118, through which shafts, 119, and, 120, extend and carry sprocket-wheels, 121, which latter are revolved in a vertical plane directly above the can caps, 122, (see Fig. 1). A sprocket-chain, 123, passes around the wheels, 121, and this chain carries a plurality of brackets, 124, which are spaced at equal distances apart,—the distance being equal to the distance between the centers of two adjoining cans while on the can seats. Each of these brackets on the sprocket chain carries a roller, 125, and the rollers are loosely mounted in the brackets by providing a central hole, 126, which is much larger than the pin, 127, passing through it, as seen in Fig. 17. In order to support the upper stretch of the sprocket chain, 123, between the sprockets I provide a plurality of bracket-arms, 128, which are bolted to the bar, 117, and extend vertically and then laterally beneath the said upper stretch of the chain and to the upper ends of these brackets I secure a horizontal rail, 129, on which the upper stretch of the chain slides. The lower stretch of the sprocket chain is sustained between the sprockets by means of parallel rails, 130, which are attached to suitable brackets, 131. These rails however only sustain the chain during the absence of cans beneath the rollers. In order to cause the weights to travel with the can-caps on which they rest, I have provided a sprocket wheel, 132, on the shaft, 120, around which a driving chain, 133, travels, as seen in Fig. 2.

In order to enable cans that have just been filled to be entirely closed with but one handling I have constructed a machine in which the cans are placed on an endless carrier where they remain without shifting, either by hand or mechanically, until all of the necessary operations are performed in effecting their complete and final closure and as far as I am aware I believe I am the first to construct a single endless carrier machine to operate in this manner.

It will be understood that the endless carrier with the cans thereon travels along opposite sides of the machine and turns at the ends by means of sprocket wheels.

In order to effect a complete closure by soldering, the cans after they have been filled must have flux applied to their cap-seats; the caps must then be soldered and then cooled, and finally, the vent hole in the cap must be closed. By means of my machine a can when placed on the carrier will be subjected to all these operations before it is removed from the carrier.

At the feed side of the machine and before the cans pass beneath the soldering irons I provide a flux device, 134, which operates to apply flux to each cap and can-seat as it advances toward the soldering irons. The form and construction of this flux device is made the subject of a companion application executed and filed by me simultaneously with the present application, and a description of its construction will therefore be omitted in the present application. At the discharge side of the machine and after the capped cans have passed beyond the cap holder, I provide a device, 135, for tipping or soldering the vent-holes and effecting the final closure of the can. This tipping device also forms the subject of a companion application executed and filed simultaneously with the present application and description of it is also omitted herein.

It will therefore be seen that in my machine the single endless sprocket chain carrying an endless series of can-seats will convey a can without change from the time it is filled until after it is tipped.

The fluxer is operated through a horizontal shaft, 136, gears, 137, and, 138, and a vertical shaft, 139, and the tipper is also operated from the shaft, 136, by gears, 140, and, 141, and vertical shaft, 142.

Having thus described my invention what I claim as new and desire to secure by Letters Patent is,—

1. A can-cap soldering machine having a series of non-rotating soldering irons traveling in a circular horizontal path; a plurality of can-seats rotatable in a horizontal plane to support the cans on their ends; means for moving the rotatable can seats into and through a partial circular horizontal path to present the cap end of the cans uppermost and beneath the irons, and means for diverting the cans' seats from their circular path.

2. A can-cap soldering machine having a plurality of non-rotating traveling soldering irons; a vent-hole tipping iron; a can-conveyer moving with the traveling soldering irons and then past the tipping iron, and means for revolving the cans as they travel with the soldering irons.

3. A can-cap soldering machine having a plurality of non-rotating traveling soldering irons; a tipping iron outside of the path of the soldering irons to solder the vent-holes in the can-caps; an endless series of can-seats for carrying the cans through the path of the soldering irons and from the latter past the said tipping iron and means for rotating the can seats while they are traveling with the irons.

4. A can-cap soldering machine having a plurality of non-rotating soldering irons traveling through a circular path; a tipping iron outside of the circular path of the soldering irons; means for imparting a rotary motion to the cans, and an endless can-supporting conveyer for carrying the cans through a partial circular path with the soldering irons and then from the latter to the tipping iron.

5. A can-cap soldering machine having a plurality of soldering irons traveling through a circular path; a tipping iron outside of the circular path of said irons; a flexible endless conveyer having a plurality of can-seats,—said conveyer traveling through a partial circular path with the soldering irons and then traveling past the tipping iron, and means for rotating the can-seats on the conveyer only while they travel with the soldering irons.

6. A can-cap soldering machine having a plurality of soldering irons traveling in a circuit; a flux device outside of the path of said traveling soldering irons; a tipping iron, and a series of can-seats traveling past the flux device and moving in a partial circular path with the soldering irons and then traveling past the tipping iron.

7. A can-cap soldering machine having a plurality of soldering irons traveling in a circular path; means outside of the path of said irons for holding the caps down on the cans while the solder cools, and a conveyer for carrying the cans in a partial circular path with the irons and then presenting the cans to the said cap holder.

8. A can-cap soldering machine having a plurality of soldering irons traveling in a circular path; a cap-holder outside of the circular path of said irons to hold the caps down on the cans while the solder cools; an endless conveyer having a plurality of can-seats and traveling in a partial circular path with the irons and then passing the said cap-holder; and means for rotating said can-seats only while they are traveling with the soldering irons.

9. A can-cap soldering machine having a flux-applying device; a plurality of soldering irons traveling in a circuit; a cap-holding device to hold the caps down while the solder cools; a tipping iron to apply solder to the vent-hole in the can-cap; an endless conveyer having rotatable can-seats and traveling past the several named devices, and means to cause the can-seats to rotate only while passing the flux-applying device and the soldering irons.

10. A can-cap soldering machine having a plurality of soldering irons traveling in a circular path; an endless flexible chain conveyer leading to the soldering irons, and moving in a partial circular path therewith and then passing from said irons; rotatable can-seats mounted at the joints of said flexible chain conveyer; means for rotating said seats only while they are traveling with the soldering irons, and a solder-feed device.

11. A can-cap soldering machine having a plurality of non-rotating soldering irons traveling in a circular path; a sprocket wheel below said irons; an endless sprocket chain traveling over said wheel; rails beyond said wheel for sustaining said chain; a plurality of can-seats mounted at the joints of said chain; means for rotating said seats while they are traveling with the irons and a solder-feed device.

12. A can-cap soldering machine having a tubular shaft; a head revolving with said shaft; a plurality of non-rotating soldering irons carried by said head; a fire-box movable with each of said irons; a burner for each of said fire-boxes and irons; means for vertically adjusting the position of the fire-boxes, irons and burners simultaneously on said shaft, and a can-conveyer below the irons.

13. A can-cap soldering machine having a tubular shaft; a head revolving with said shaft; a plurality of soldering irons carried by said head; a gas-chamber surrounding the shaft and sustained by the head; a plurality of burners radiating from said chamber; means whereby the said head, irons, gas-chamber and burners may all be moved simultaneously on the shaft, and a can-conveyer below said irons.

14. A can-cap soldering machine having a plurality of traveling soldering irons; an endless series of can-seats below said irons, and removable division blocks between adjacent can-seats.

15. A can-cap soldering machine having a plurality of traveling soldering-irons; an endless chain carrier; a plurality of can-seats on said carrier and a plurality of removable division blocks on the carrier, each block projecting between two adjacent can seats.

16. A can-cap soldering machine having a plurality of soldering irons; an endless can-conveyer traveling past the soldering irons, and a movable cap-holder having an endless series of cap-contact devices to engage the caps on the cans as the latter leave the soldering irons.

17. A can-cap soldering machine having a plurality of soldering irons traveling in a circular path; an endless can-conveyer traveling through a partial circular path with the irons and then diverging from said irons; a movable cap-holder adjacent the conveyer at the point where the latter diverges from said irons,—said cap-holder having a plurality of devices to contact with the caps on the cans, and means for moving the cap-contact devices with the can-conveyer.

18. A can-cap soldering machine having a plurality of soldering irons; a conveyer for conducting the cans to and from the soldering irons; an endless chain beyond the soldering irons and carrying a plurality of cap-holding devices, and means for moving said endless chain and cap-holding devices with the cans.

19. A can-cap soldering machine having a plurality of soldering irons; a conveyer for conducting the cans to and from the soldering irons; an endless chain beyond the soldering irons and traveling in a path with the capped cans and carrying a plurality of loosely sustained weights to rest on the caps and travel with the cans while the solder cools.

20. A can-cap soldering machine having a plurality of traveling soldering irons; a conveyer for moving the cans with said irons; a solder-feed device to apply solder to all the said irons, and means for causing the solder-feed device to travel a short distance with the said irons.

21. A can-cap soldering machine having a plurality of traveling soldering irons; a conveyer for moving the cans with said irons; a single device to apply solder to all the said irons; means for causing the said solder-device to advance to meet the said irons successively, and means for feeding the solder while the solder-device is advancing toward the irons.

22. A can-cap soldering machine having a plurality of traveling soldering-irons; a conveyer for moving the cans with said irons; a single solder device for delivering solder to the irons successively; means for reciprocating the said solder device to cause it to travel with the soldering irons, and devices operated by a can on the conveyer to enable solder to be fed while the solder device is being reciprocated.

23. A can-cap soldering machine having a plurality of traveling soldering-irons; a conveyer having can-seats for moving the cans with said irons; a solder-feed device for delivering solder to the said irons successively; means for advancing the solder-feed device to meet the said traveling irons and to return therewith and means whereby the absence of a can from a can-seat will enable the solder-feed device to advance but without feeding solder.

24. A can-cap soldering machine having a plurality of traveling soldering-irons; a conveyer having seats on which the cans are moved; a solder applying device movable in the same plane with the said irons; a solder-feed device; a lever moving with the solder-applying device and projecting in the path of the moving cans, and a trip device coacting between the lever and the solder-feed device to stop the feed of solder when a can is absent from a seat.

25. A can-cap soldering machine having a plurality of traveling soldering irons; a conveyer for moving the cans with said irons; a solder device movable in a plane with the irons and having a pawl and ratchet device to feed the solder during its movement; a lever projecting in the path of the moving cans, and a trip device operated by the lever during the absence of a can to prevent engagement of the pawl and ratchet.

26. A can-cap soldering machine having a plurality of traveling soldering irons; a conveyer for moving the cans with the irons; a solder-device having a solder distributer to register and travel with the iron successively; means for feeding solder to the distributer, and means whereby the said distributer may travel with a soldering iron during the absence of a can without the solder being fed.

27. A can-cap soldering machine having a series of non-rotating soldering irons which travel in a circular horizontal path; an endless series of can seats; means for moving the can seats horizontally into the circular path of and in register with the traveling irons then through a portion only of the circular path with said irons and finally divert said seats and cause them to travel out of the circular path, and means for horizontally rotating those seats of the series that are traveling through the circular path with the irons.

28. A can-cap soldering machine having a plurality of non-rotating soldering irons traveling in a circular path; a flux applying device outside of the path of said non-rotating traveling irons; a tipping iron also outside of the circular path of the traveling irons; an endless series of can seats traveling past the flux device then through the circular path with the traveling non-rotating irons and finally past the tipping iron, and means for rotating said seats while they are traveling in the circuit with the soldering irons.

In testimony whereof I affix my signature in presence of two witnesses.

CHARLES H. AYARS.

Witnesses:
  JONATHAN W. ACTON,
  BENJAMIN E. HARRIS.